United States Patent [19]

Paulsson et al.

[11] 3,915,796

[45] Oct. 28, 1975

[54] FERMENTATIVE PREPARATION OF TRYPTOPHAN DERIVATIVES

[75] Inventors: Lars-Erik Paulsson; Lars Ingvar Wiberger; Ake Willard Ohlsson, all of Karlskoga, Sweden

[73] Assignee: Aktiebolaget Bofors, Bofors, Sweden

[22] Filed: Jan. 22, 1973

[21] Appl. No.: 325,789

[30] Foreign Application Priority Data

Feb. 3, 1972 Sweden .............................. 1231/72

[52] U.S. Cl. .................................................. 195/29

[51] Int. Cl.² .......................................... C12D 13/06

[58] Field of Search ........................... 195/28, 29, 30

[56] References Cited

UNITED STATES PATENTS 3,591,456 7/1971 Tanaka et al. ........................ 195/29

FOREIGN PATENTS OR APPLICATIONS 1,948,796 8/1970 Germany ............................. 195/29

OTHER PUBLICATIONS

Chemical Abstracts, Vol. 59, 3287b.

*Primary Examiner*—Lionel M. Shapiro
*Assistant Examiner*—Robert J. Warden
*Attorney, Agent, or Firm*—Pollock, Philpitt & Vande Sande

[57] ABSTRACT

The present invention relates to a process for continuous fermentative preparation of L-tryptophan and derivatives thereof.

The process comprises culturing the microorganism *Candida humicola* under aerobic conditions in a continuously supplied nutrient substrate with a separate continuous supply of the corresponding indole derivative.

The present invention has now made it possible to carry out a continuous process that has the advantage to give L-tryptophan or a derivative thereof at such a low price that it may be used as an additive to food stuffs and feed stuffs.

8 Claims, No Drawings

FERMENTATIVE PREPARATION OF TRYPTOPHAN DERIVATIVES

BACKGROUND

Chemical synthesis as preparation methods for tryptophan and tryptophan derivatives have hitherto not been found to be a possible way to obtain tryptophan at those low prices that are required if the substance shall get a wider use for amino acid fortification of vegetable proteins.

However, a great number of processes are previously known, which describe fermentative preparation involving different yeasts and bacteria. Most of these processes are using indole as a precursor. The processes are as a rule batchwise processes based on normal fermentative substrates containing yeast extract, meat extract, corn steep liquor any other complex nutrient medium.

The reason for the fact that continuous processes for the production of tryptophan and tryptophan derivatives have not been discussed before, might be the considerable problems with degradation of the tryptophan produced. Furthermore during a continuous cultivation the culture will be subjected to great risks of forming undesired mutants. A continuous process will however have many advantages from economical and technical points of view.

THE PRESENT INVENTION

The process according to the invention is based on the use of an isolate of *Candida humicola* that has been obtained after screening of more than 600 organisms from different soil samples. The isolate is diagnosed and is deposited in Centraal Bureau voor Schimmelcultures under number J IA CH XII (CBS 6434).

The derivatives of tryptophan, which advantageously may be prepared by means of *Candida humicola*, have the following general formula:

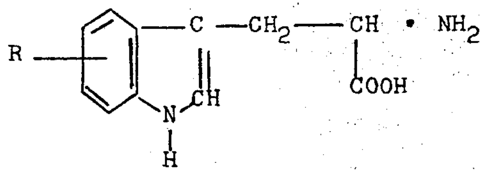

wherein R may be selected from hydrogen, hydroxy, halogen, lower alkyl and lower alkoxy. Many of these derivatives are of great interest to the pharmaceutical industry and are charged with very high prices on the market.

The process according to the present invention for the preparation of the above defined tryptophan derivatives, is substantially characterized by culturing the microorganism *Candida humicola* under aerobic conditions in a continuously supplied nutrient substrate with a separate continuous supply of the corresponding indole derivative. The indole derivative has the formula:

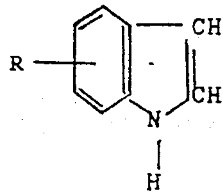

wherein R is hydrogen or hydroxy or halogen or alkyl or alkoxy.

The microorganism as used is characterized by a very high productivity of L-tryptophan from indole. As the microorganism is sensitive to a too high concentration of indole in the culture liquor, a continuous supply of the precursor must be made. The microorganism may be cultured on a completely defined substrate and besides carbohydrates and thiamine it does not require any other organic substances for its growth.

This isolate of *Candida humicola* has a partially working tryptophan metabolism including tryptophan degradation started by tryptophan pyrolase activity. By changing the culture conditions and the substrate composition the degradation may however be adjusted (controlled) in such a way that no decrease of the tryptophan yield may be seen. Due to the fact that the strain in this respect is connected to wildtypes it may be cultured during very long times in continuous culture without obtaining any negative mutants.

In order to stimulate the formation of mutants which give no tryptophan degradation, niacin may be added to the substrate in a concentration of about 0.05– 0.5 g/l of the substrate.

The supplied amount of indole is brought in through the wall system of the cell and is converted by intracellular enzyme systems to tryptophan which is obviously carried out again to a major portion.

Comparatively low concentrations of free indole may decrease the growth velocity of the cells. The conversion of indole to tryptophan occurs however very rapidly and a supply of e.g. 0.5 % (w/v) of indole in relation to the substrate supply, will give slight amounts of free indole in the fermentor liquor. It is important to make the estimate of indole in the fermentor on substrate containing cells as a very large amount of the free indole is intracellular.

The feature that appears to have the greatest influence on the conversion velocity of indole to tryptophan and on the degradation of tryptophan via kynerenine, is the concentration of biologically available iron, e.g. in the form of ferrous citrate. The concentration of iron ($Fe^{2+}$) in the culture liquor must be below the contents that will give degradation of tryptophan but be above the contents at which the growth of the culture will be severely disturbed and continuous culture thus be impossible.

The contents of biologically available oxygen in the fermentor liquor is obviously also important as regards the degradation velocity of tryptophan, since the tryptophan pyrolase is an enzyme containing a haem group and the degradation of tryptophan is thus an oxidative process.

At a low supply of oxygen gas (aeration) it is possible to maintain a somewhat higher $Fe^{2+}$ -content in the culture liquor while the $Fe^{2+}$ -content should be low at a higher supply of oxygen gas. These observations are valid for non-mutated Candida humicola.

During a continuous culture for a longer time mutants with no degradation of tryptophan may be formed due to general culture conditions (the composition of the substrate (principally niacin), indole supply). In this case the concentration of $Fe^{2+}$ will of course be without importance to the degradation and it may be maintained at a considerably higher level and therefore molasses normally having high $Fe^{2+}$ -content may be used as a carbon source.

In order to control the process so that the indole supply will not give high values of residual indole in the fermentor contents, which will give a ceasing growth, a number of analyses are carried out. The titration frequency and the level of oxygen saturation will increase strongly at an increased content of residual indole due to the fact that the aerobic metabolism is changed to an anaerobic one. These values are followed up and may be used to control the supply of ferrous citrate or the aeration. The cell volume is also followed up but the changes are here so slow that they cannot be used in the control of the process.

The analyses on residual indole are carried out with unseparated fermentor contents on a gas chromatograph with o-nitrophenyl ethanol dissolved in methanol as an internal standard. Analyses on cellfree fermentor liquor do not give valuable information, since the indole is so rapidly absorbed by the cell. Too high contents of residual indole may also be used as a control signal to decrease the supply velocity of indole and/or to increase the iron supply and/or to increase the aeration.

In order to control that the tryptophan production is not disturbed by too high iron supplies, continuous analyses are carried out on a dextran gel column (Sephadex) with UV cord and thereafter separate UV-analysis of the tryptophan fractions. These analyses give a good indication of metabolites of tryptophan principally kynerenic acid. UV cord is a photometer for UV-light sold by LKB-Produkter Sweden. It has also been found that the capacity of the used strain to synthetize tryptophan is not limited by fead-back inhibition. Thus the culture stands up to about 15 g/l of tryptophan without changing the synthesis velocity.

One feature that restricts the production of this described process type is the capability of the micro-organism of serine production. Tests have proved that the consumption of indole of the strain momentarily increases considerably when serine is supplied.

As serine is too expensive a substance to be used as a substrate component, the effect of a glycine addition has been studied and glycine has been found to have the same effect on the system as serine but this effect will come after a couple of hours. A greater supply velocity of indole may be maintained with a glycine addition of about 1 – 10 g/l.

For the isolation and purification of the produced tryptophan an ion exchange method was used on comparatively cell-free fermentor liquor. The ion exchange matrix had a low degree of cross linking or was of a so-called macro-reticular type. The flow used was 0.1 bed volumes (BV) per hour. Washing was carried out with distilled water and eluation with 50 % ethanol and 50 % 1-normal ammoniak by back wash. The tryptophan solution thus obtained was neutralized with HCl and tryptophan crystals were obtained. The yield was about 95 %.

The product as obtained had 100 % biologic activity according to a test with S. fecalis. No contaminations being positive in the Ehrlich and ninhydrine tests were present.

The following examples are illustrative of the present invention and are not to be considered as limiting.

EXAMPLE 1

Low indole supply and high Fe-content Fermentor: Chemap GF 0014 with mechanic foam quencher.

| | |
|---|---|
| Number of evolutions | 2000 r/min |
| Substrate velocity | 200 ml/h |
| Volume | 4.8 l |
| Dilution velocity | 4.1 % |
| Temperature | + 26° C |
| Substrate | Indole 1 g |
| | p-aminobensoic acid (PABA) 0,1 g |
| | Yeast extract 25 g |
| | Solution A 200 ml |
| | Solution B 200 ml |
| | Solution C 200 ml |
| | Glucose 1 kg separately autoclaved |
| | Distilled water up to 10 liters |
| pH: | 5.5 |
| Solution A: | 3 % $CaCl_2 2H_2O$ |
| Solution B: | 10 % $KH_2PO_4$ |
| Solution, C: | 5 % $MgSO_4 2H_2O$ |
| | 0.125 % Fe-citrate |
| | 0.015 % $MnSO_4 4H_2O$ |
| | 0.02 % $ZnSO_4 7H_2O$ |
| | 10 % NaCl |
| Aeration: | 80 l/h and 1 culture |

Inoculation occured with about 50 ml of a 24 hours old culture of *Candida humicola* which had been grown on a rotary shaker. pH during the culturing was maintained at about 6.5 and titration occured with $NH_3$. The culture was grown during 24 hours and then the pumping of substrate and indole was started. The velocity of the indole supply was 0.14 % (w/v) of that of the substrate.

At this content of Fe-citrate, 24 mg/l, a good velocity of indole was obtained and no residual indole could be seen. The tryptophan production failed completely to appear due to the fact that the tryptophan as formed was at once degradated to kynerenic acid among others.

EXAMPLE 2

Low indole and low Fe-contents. The same conditions as in Example 1 were used but the substrate had the following composition.

| | |
|---|---|
| $NH_4C$ | 50 g |
| Niacine | 0.5 g |
| Fe-citrate | 10 mg |
| Thiamine | 50 mg |
| Solution K: | 10 ml |
| Solution A: | 100 ml |
| Solution Bf: | 200 ml |
| Solution Bk: | 200 ml |
| Solution C: | 200 ml |
| Sacharose | 1 kg |
| Distilled water up to 10 liters | |
| Solution A: | 0.75 % $CaCl_2 2H_2O$ |
| Solution Bf: | 8 % $K H_2PO_4$ |
| | 2.56 % $K_2HPO_4$ |
| Solution Bk: | 10 % $KH_2PO_4$ |
| Solution C: | 7.88 % $MgSO_4 7H_2O$ |
| | 0.11 % $MnSO_4 H_2O$ |
| | 0.02 % $ZnSO_4 7H_2O$ |
| | 10 % NaCl |
| Solution K: | 0.068 g ammoniummolybdate |
| | 0.34 g $CuSO_4$ |

Inoculation, pH and culturing as in Example 1.

The velocity of the indole supply was 0.265 % as calculated on the substrate supply. The production of tryptophan during the culture was 3.6 g/liters, 24 hours (yield 78%). No degradation could be seen.

EXAMPLE 3

High indole content and a batchwise supply of Fecitrate.
Conditions as in Example 1
Substrate as in Example 2
Inoculation as in Example 1
pH as in Example 1
Culturing as in Example 1

The indole supply was 0.53 % (w/v) of the substrate supply. The production of tryptophan during the culturing was on the average 6.8 g/liters, 24 h (yield 74 %). The supplies of Fe was made at each increase of the content of residual indole. The amount of $Fe^{2+}$ that was supplied each time gave a Fe content corresponding to that of the substrate.

EXAMPLE 4

Continuous supply of Fe-citrate.
Conditions as in Example 1
Substrate as in Example 1
Inoculation as in Example 1
pH as in Example 1
Culturing as in Example 1 but the aeration was 10 liters/hour and liter of culture.

The iron supply during this experiment was such that the concentration of iron in the substrate was about 2 ppm (parts per million). The indole supply was 0.4 % of the substrate supply. The production of tryptophan during the culturing was 5.9 g/liter and 24 hours on an average (yield 80.5 %). When the culturing had been stabilized no degradation could be seen.

EXAMPLE 5

Influence of glycine.
Conditions as in Example 1
Substrate as in Example 1 but $Fe^{2+}$ is 2 ppm and 15 grammes
glycine/10 l are added.
Inoculation as in Example 1
pH as in Example 1
Culturing as in Example 1
Aeration about 10 liters/hour and liter of culture.

The indole supply during this experiment was 0.8 % of the substrate supply. The production of tryptophan was 10.4 g per liter and 24 hours (yield 75 %). A very low level of residual indole was obtained during the whole culturing time. Degradation of tryptophan was kept on a very low level, which was indicated by the fact that only 0.2 g of kynerenic acid was formed.

The invention is of course not limited to the conditions set forth in the above Examples, but variations may be made within the scope of the claims.

We claim:

1. A process of continuous fermentative preparation of L-tryptophan derivatives having the general formula:

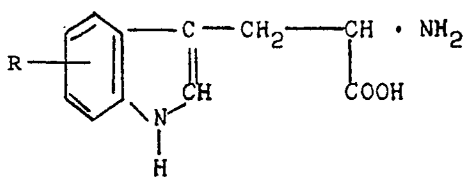

wherein R is selected from the group of hydrogen, hydroxy, halogen, alkyl and alkoxy characterized by culturing *Candida humicola* number J IA CG XII (CBS 6434) under aerobic conditions in a continuously supplied nutrient substrate containing at least thiamine and carbohydrates as organic substance with a separate continuous supply of the corresponding indole derivative having the formula:

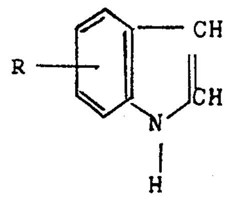

where R has the above-stated meanings and thereby preparing said L-tryptophan derivatives.

2. The process of claim 1 wherein niacin is added to the nutrient substrate.

3. The process of claim 2 wherein the niacin is added in a concentration of about 0.05 to 0.5 grams per liter of the substrate.

4. The process of claim 2 wherein glycine is added to the nutrient substrate.

5. The process of claim 4 wherein the glycine is added in an amount of about 1 to 10 grams per liter of the substrate.

6. The process of claim 5 wherein iron is added to the nutrient substrate.

7. The process of claim 1 wherein glycine is added to the nutrient substrate.

8. The process of claim 1 wherein iron is added to the nutrient substrate.

* * * * *